Sept. 6, 1938. K. SCHLESINGER 2,129,033

CATHODE RAY TUBE

Filed Oct. 20, 1934

Inventor:

Kurt Schlesinger

Patented Sept. 6, 1938

2,129,033

UNITED STATES PATENT OFFICE 2,129,033

CATHODE RAY TUBE

Kurt Schlesinger, Berlin, Germany, assignor to Radioaktiengesellschaft D. S. Loewe, Berlin-Steglitz, Germany Application October 20, 1934, Serial No. 749,235
In Germany October 23, 1933

6 Claims. (Cl. 250—27.5)

The present invention relates to Braun tubes especially for television purposes comprising two pairs of deflecting plates for deflecting the ray in two directions perpendicular to each other for scanning the picture receiving screen.

One object of the present invention is to provide means for limiting the deflecting field to the space between the condenser plates and to restrict as far as possible the marginal fields apt to exert disturbing influences on the cathode ray. As shown by potential-theoretical considerations, this object cannot be achieved beyond a certain extent by screening off the deflecting condenser, as has been previously proposed.

According to the present invention means are provided for compensating unavoidable marginal fields. As compensating means preferably identical counter-fields may be employed.

The invention will be more fully understood from the appended drawing, Figs. 1 to 4, which illustrate possible forms of embodiment of the invention.

Figure 1:
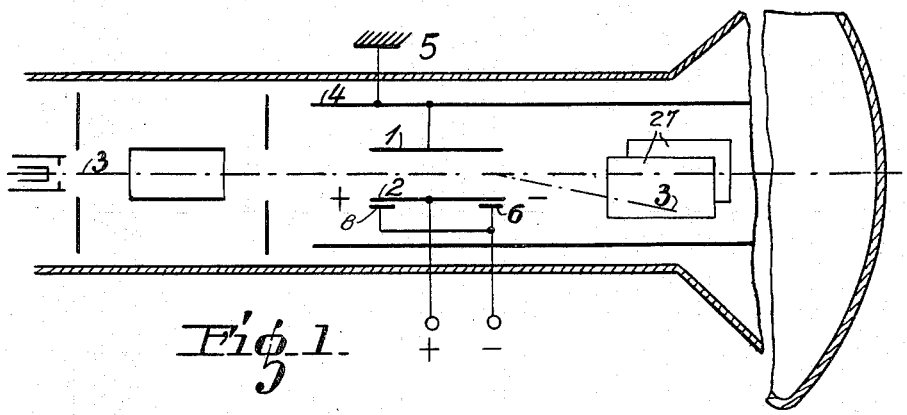

In Fig. 1 an arrangement is shown, in which the plates 1 and 2 serve in the usual way for deflecting the cathode ray 3 in one direction. The plates are mounted within a tube 4, which is connected with a fixed potential, for example, with earth, at 5''. If now the plate 2, as shown, is raised to a positive potential in relation to the plate 1, and if the latter, for example, is connected with the earthed tube, as illustrated, a compensation of the field outside of the condenser 1, 2 may be produced in accordance with the invention with the use of a further field generator 6 which is arranged at practically the same place as the edge of the deflecting plate 2. According to the invention, this field generator is so formed that the potential produced by the same is at each point outside of the condenser equal in extent, but opposite in sign to the marginal field of the condenser 1, 2 alone. The plate 6, in accordance with the invention, is charged to just the same extent negatively against earth as the plate 2 is positive against earth. According to an additional feature of the invention this may be performed by means of suitable reverse phase circuits described in the following. 27 indicates the second pair of deflecting plates.

Figure 2:
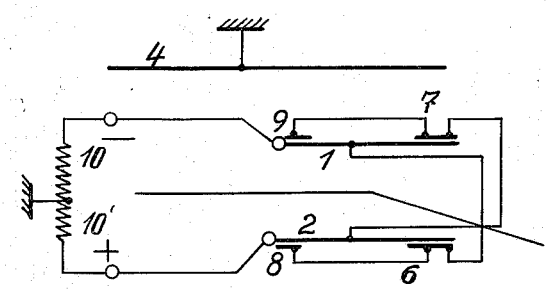

Fig. 2 shows another embodiment of the invention possessing the further advantage that the negative reversed potential of the plate 6 may also be made use of for deflecting the cathode ray. For this purpose the earthing of the plate 1 is done away with. According to the invention, the plate 1 is connected with the plate 6, whilst an auxiliary plate 7 is provided in the vicinity of the edge of 1. If as shown the plate 7 is connected with 2, and 1 with 6 in cross connection, it is possible with this arrangement to obtain twice the sensitiveness as compared with the arrangement in Fig. 1 if, as illustrated, the pairs of plates are operated in reverse phase by a current source 9, 10, which may consist of a transformer, which is earthed at its electric center.

In the case of certain complicated forms of oscillations, for example relaxation oscillations in the television art, circuits are particularly convenient for producing the reverse potential in which all resistances are ohmic or capacitive.

Figure 3:
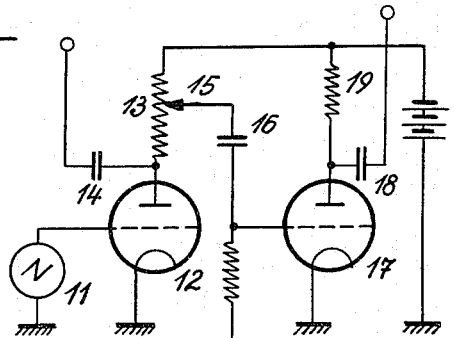

Fig. 3 shows a circuit comprising an aperiodic counter-cadence amplifier which may be employed with particular advantage for the purpose of the invention. The preferably saw-tooth-shaped relaxation oscillation is produced by a relaxation oscillation generator 11 and conducted to a first amplifier tube 12, from the anode resistance 13 of which the amplified potential is taken in full extent through the medium of a condenser 14 and conducted for example to the plates 1 and 6 in Fig. 2. A fraction of this potential is conducted to the tube 17 via the wiping contact 15 and condenser 16, and appears with reversed phase but equal amplitude—which may be adjusted by 15—via the condenser 18 at the terminal 19, from where the same is conducted to the other plates 2 and 7 of the tube in Fig. 2.

In the arrangement in Figs. 1 and 2 the marginal field of the deflecting condenser is eliminated at the side of said condenser where the cathode ray leaves the same. By the provision of additional plates 8 and 9 in Fig. 2 or 8 in Fig. 1, connected in the manner indicated, it is naturally also possible to overcome the marginal field at the side of the condenser where the cathode ray enters.

Figure 4:
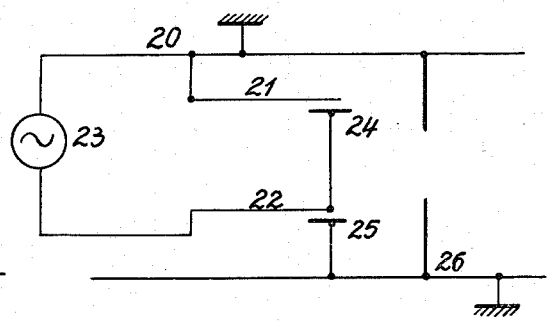

Fig. 4 shows an arrangement, in which such marginal fields, the field lines of which run transversely to the movement of the ray, are converted into such fields in which the field lines run substantially in the direction of the ray. This arrangement may be operated without a reverse phase circuit.

In this figure, 20 is again the metallic tube connected with earth, and 21 a plate, which is connected with earth either directly or over a condenser. The plate 22 is connected with the generator 23 which produces the deflecting potential. According to the invention there is provided on the inner side of the deflecting condenser an auxiliary electrode 24 connected directly with the plate 22. On the other hand a counter-electrode 25 is provided on the outside of 22 and connected to earth. In this case, too, any deflecting marginal field is eliminated in points outside of the condenser. On the other hand it is true that the potential of the surroundings of the condenser is, in this arrangement, varied in proportion to the mean value between the potential of the plates 21, 22. In the majority of cases, however, this fact does not constitute any appreciable drawback in the construction of cathode ray tubes. An additional improvement may be obtained by means of a diaphragm 26 with correspondingly wide apertures, which diaphragm is connected with the earthed tube smaller than the distance between the plates 21 and 22.

The means which are described in the above with respect to one pair of deflecting plates may of course be also made use of in connection with the second pair of deflecting plates.

The metallic tube 4 may as well be replaced by a metallic coating arranged on the inside of the wall of the Braun tube and may occasionally be omitted.

The Braun tube is furnished in the manner known per se with a cathode, an anode and a picture receiving screen and may include means for controlling the intensity of the ray as well as means for concentrating the ray.

The diaphragm 26 may be a part of the electronoptical concentrating system.

Further diaphragms of this kind may be arranged between the two pairs of deflecting plates and/or between the deflecting plates and the screen.

I claim:

1. A Braun tube comprising means for producing a cathode ray, means for controlling the intensity of the cathode ray, means for concentrating the cathode ray, a picture receiving screen, two deflecting plates, a metallic cylinder surrounding said deflecting plates, means for connecting one of said plates with said cylinder, and two auxiliary electrodes, each of said electrodes being mounted near one end of the second deflecting plate and spaced from the first said plate to a distance of the same order of magnitude as the distance between said two plates, each of said auxiliary electrodes being adapted to be supplied with an auxiliary voltage having the same amplitude as the deflecting voltage but reverse phase.

2. A Braun tube comprising means for producing a cathode ray, means for controlling the intensity of the cathode ray, means for concentrating the ray, a picture receiving screen, and two electrostatical deflecting units for deflecting the cathode ray for the purpose of scanning said screen, each of said deflecting units comprising two main deflecting plates and four auxiliary electrodes, each of said auxiliary electrodes being mounted on a level with one edge of one deflecting plate, and means for directly connecting each two of said auxiliary electrodes mounted near one of said main deflecting plates with the other of said main deflecting plates.

3. A Braun tube comprising an evacuated envelope enclosing a cathode, an anode mounted in operative relationship to said cathode, means for controlling the intensity of the cathode ray, means for concentrating the cathode ray, a picture receiving screen and two deflecting systems mounted between said anode and said screen for deflecting the cathode ray for the purpose of scanning said screen, each of said deflecting systems comprising two main deflecting plates and at least two auxiliary electrodes, each of said auxiliary electrodes being mounted in the vicinity of one of said deflecting plates between the respective deflecting plate and the wall of the envelope, the greatest dimension of each of said auxiliary electrodes extending in the direction perpendicular to the direction of the ray, and means for directly connecting each of said auxiliary electrodes with the opposite plate of the respective deflecting system.

4. A Braun tube comprising means for producing a cathode ray beam, a picture receiving screen, at least one pair of deflecting plates having edges transverse to the mean direction of the beam for causing said cathode ray beam to sweep over said picture receiving screen, and a pair of auxiliary electrodes mounted near said transverse edges at the beam entering end of said plates, the greatest dimension of each of said auxiliary electrodes extending in the direction perpendicular to the mean direction of the ray beam.

5. A Braun tube comprising means for producing a cathode ray beam, a picture receiving screen, at least one pair of deflecting plates having edges transverse to the mean direction of the beam for causing said cathode ray beam to sweep over said picture receiving screen, and a pair of auxiliary electrodes mounted near said transverse edges at the beam leaving end of said plates, the greatest dimension of each of said auxiliary electrodes extending in the direction perpendicular to the mean direction of the ray beam.

6. A Braun tube comprising means for producing a cathode ray beam, a picture receiving screen, at least one pair of deflecting plates having edges transverse to the mean direction of the beam for causing said cathode ray beam to sweep over said picture receiving screen, a pair of auxiliary electrodes mounted near said transverse edges at the beam entering ends of said plates, and a further pair of auxiliary electrodes mounted near said transverse edges at the beam leaving end of said plates, the greatest dimension of each of said auxiliary electrodes extending in the direction perpendicular to the mean direction of the ray beam.

KURT SCHLESINGER.